United States Patent
Pearson

(10) Patent No.: US 7,293,059 B2
(45) Date of Patent: Nov. 6, 2007

(54) DISTRIBUTED COMPUTING SYSTEM USING COMPUTING ENGINES CONCURRENTLY RUN WITH HOST WEB PAGES AND APPLICATIONS

(75) Inventor: Kirk Pearson, Broomfield, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 950 days.

(21) Appl. No.: 10/407,414

(22) Filed: Apr. 4, 2003

(65) Prior Publication Data

US 2004/0199633 A1    Oct. 7, 2004

(51) Int. Cl.
G06F 15/16 (2006.01)
G06F 15/173 (2006.01)

(52) U.S. Cl. .............. 709/201; 709/218; 709/224; 709/226; 709/229

(58) Field of Classification Search ............... 709/201, 709/202, 218, 226, 227, 229, 238
See application file for complete search history.

(56) References Cited

U.S. PATENT DOCUMENTS

| | | | |
|---|---|---|---|
| 5,930,780 | A | 7/1999 | Hughes et al. |
| 6,185,619 | B1 | 2/2001 | Joffe et al. |
| 6,192,388 | B1 | 2/2001 | Cajolet |
| 6,249,836 | B1 | 6/2001 | Downs et al. |
| 6,272,546 | B1 | 8/2001 | Ludtke |
| 6,385,625 | B1 | 5/2002 | Slaughter |
| 6,418,462 | B1 * | 7/2002 | Xu .............................. 709/238 |
| 6,463,457 | B1 | 10/2002 | Armentrout et al. |
| 6,523,065 | B1 | 2/2003 | Combs et al. |
| 6,950,991 | B2 * | 9/2005 | Bloomfield et al. ........ 709/227 |
| 7,130,891 | B2 * | 10/2006 | Bernardin et al. .......... 709/218 |
| 2002/0019844 | A1 * | 2/2002 | Kurowski et al. .......... 709/201 |
| 2002/0188734 | A1 * | 12/2002 | Johnson ...................... 709/229 |
| 2003/0009533 | A1 | 1/2003 | Shuster |
| 2003/0225822 | A1 * | 12/2003 | Olson et al. ................ 709/202 |
| 2004/0068553 | A1 * | 4/2004 | Davis et al. ................ 709/218 |
| 2004/0068731 | A1 * | 4/2004 | Davis et al. ................ 719/310 |
| 2006/0294238 | A1 * | 12/2006 | Naik et al. .................. 709/226 |

OTHER PUBLICATIONS

Fedak, Gilles, Germain, Cecile, Neri, Vincent, Cappello, Franck, "XtremWeb: A Generic Global Computing System", Laboratorie de Recherche en Informatique, XP-002436445, IEEE, 2001, pp. 582-587.

Anderson, David P., Cobb, Jeff, Korpela, Eric, Lebofsky, Matt, Werthimer, Dan, "SETI@home, An Experiment in Public-Resource Computing", Communications of the ACM, XP-002436446, Nov. 2002, vol. 45, No. 11, pp. 56-61.

* cited by examiner

*Primary Examiner*—Quang N. Nguyen
(74) *Attorney, Agent, or Firm*—William J. Kubida; Michael C. Martensen; Hogan & Hartson LLP

(57) ABSTRACT

A method, and associated system, for performing distributed computing. The method includes linking a user node to a communications network including a processor with a processing capacity, memory, and a browser for viewing documents provided over the network. The method includes operating the browser to request a document from a server linked to the network and then receiving a host document or host web page. The browser views the host document and loads a distributed application that requests work from the server. The user node receives work units from a distributed computing project associated with the distributed application. The distributed application is run by the processor using excess capacity to process the work unit to generate a result. The method determines if the browser is still viewing the host document and the processor is available. The browser may be replaced with a user application that provides distributed computing.

14 Claims, 5 Drawing Sheets

DISTRIBUTED COMPUTING SYSTEM USING COMPUTING ENGINES CONCURRENTLY RUN WITH HOST WEB PAGES AND APPLICATIONS

BACKGROUND OF THE INVENTION

1. Field of the Invention

The present invention relates, in general, to distributed computing systems, and, more particularly, to software, systems, and methods for utilizing unused central processor unit (CPU) cycles during the running of a host web page or host user application to run a computing application or engine to perform analysis of work units for a distributed computing project.

2. Relevant Background

There is a growing demand for computers and computer systems with very large computational capacity, such as the type of computing capacity provided by modern supercomputers. The demand is arising out of such diverse projects and technical fields as astronomy and biotechnology. In the field of astronomy, a great amount of computing power is necessary to analyze all the data and signals being gathered continuously by telescopes and other devices. In the field of biotechnology, scientists utilize algorithms and large databases that require massive number crunching to help decipher genetic, protein, and other information. However, it is not economically feasible for each scientific project requiring supercomputer-type computing capacity to build or buy or even to maintain a computer system capable of meeting their needs.

Recently, distributed computing systems have been created in an attempt to provide large computing capacity to computing projects. Distributed computing involves the linking of numerous smaller computers that each provide a portion of their computing power to solve a portion of the larger computational project. Each part of the problem is typically called a "work unit" and is transferred over a network to a computer, such as a personal computer, a portable computer, a workstation, and the like, that is part of the distributed computing environment. The use of distributed computing is expected to grow because more and more computers are being networked together via the Internet and other communication networks and because these individual computers are becoming more and more powerful. This is creating a rapidly expanding pool of underutilized computers. Computer industry analysts estimate that well over 95 percent of the world's computational capacity is not utilized and is therefore wasted.

A number of applications of distributed computing are in use or are planned, but each of these applications still underutilizes the available computational capacity of the linked computers. For example, a network of volunteers has been recruited to provide their computers for use in searching through piles of signal information in an attempt to identify communication signals from extraterrestrials (see University of California Berkley's The Search for Extraterrestrial Intelligence (SETI) program). In this system, a project server sends a small spectrum of the received signals as work units to volunteer computers over the Internet and when their computer is idle, it performs computations on the work unit and transmits the results back to the project server. The volunteer's computer is typically considered "idle" when it enters screen saver mode or no applications are actively running on the computer. When the computer is operating an application or interacting with the operator, the computer is not considered idle and the analysis of the work unit is halted. Any excess capacity that might be available when an application is running or when the computer is interacting with the operator is not utilized for the distributed computing operations.

More recently, some online service companies have announced plans to only continue their free services if their subscribers agree to allow their computers to be used for distributed computing. Again, the distributed computing is only performed when the computer is considered idle, which means the distributed computing is only performed when the operators are not actively using their computers. In both of these exemplary systems, significant efforts have been made by the designers to only perform the calculations during down or idle times such that the user's computing capacity is not reduced at all when they are interacting with the computer or running their user applications.

Another problem with many existing distributed computing systems is that the systems force the volunteer or user to be responsible for properly running the distributed computing engine. In the extraterrestrial computation example, the user must volunteer their computer for use in performing distributed computing, such as by first visiting a specific web site. Then, the user must take steps to download the distributed computing application onto their computer from a server run by the distributed computing project. The user may be responsible for running the application to accept work units from the project server. Further, the user is often responsible for making sure that the running application is the most recent version and has been properly updated to correctly perform the required calculations.

Hence, there remains a need for an improved method and system for performing distributed or grid computing that limits or eliminates the need for user actions and that is more effective in utilizing the unused capacity of networked computers. Preferably, such a method and system would be relatively invisible to the user of a computer that is part of the distributed computing system but would also tap into the computing capacity on an ongoing basis, i.e., utilize a large portion of the CPU cycles that are wasted even when an operator is running a user application or otherwise actively interacting with the computer.

SUMMARY OF THE INVENTION

The present invention addresses the above problems by providing a distributed computing system in which user nodes are configured to run distributed computing applications that are bound or embedded with a host web page viewed by a browser or within a host user application run on the user node. The distributed computing applications are run when a CPU availability detector determines that the host web page is being viewed or the host user application is active and that the CPU is not busy or is available, e.g., when the CPU is operating below a certain fraction or level of its rated operating speed or capacity. In the web page environment, the distributed computing application is loaded based on instructions in the host web page, e.g., an HTML document, and acts to request work from the web server. The web server acts as a resource broker to respond to the work request by obtaining one or more work units from a distributed computing project server or system and returning the work units to the user node. Then when both operating criteria are met, the distributed computing application processes the work units and returns the results to the project server via the web server.

More particularly, a computer-based method is provided for using a user node as a distributed computing device. The method includes linking the user node to a digital data communications network, such as the Internet. The user node generally includes a CPU with a particular processing capacity, a memory device, and a browser adapted for viewing documents (such as HTML documents or web pages) provided over the network. The method includes operating the browser to request a document from a server linked to the network and then receiving a host document or host web page. The browser is then operated to view the host document, which includes carrying out instructions (alone or with other user node components) to retrieve and download a distributed computing application. The distributed computing application then acts to request work from the server, and in response, a work unit is received by the user node for a distributed computing project associated with the distributed computing application. The method then continues with running the distributed computing application to process the work unit to generate a result. When the work unit is fully processed or when the application is exited, the result is transferred to the distributed computing project via the server. The method preferably includes, prior to the running step, determining that the browser is still viewing the host document and that the CPU is available, e.g., has excess capacity, for running the application.

DETAILED DESCRIPTION OF THE PREFERRED EMBODIMENTS

The present invention is directed to a distributed computing system and method that effectively utilizes the processing capacity of networked user nodes or computing devices. According to the invention, a web server acts as a resource broker for one or more distributed computing project servers or systems by passing along work units from the distributed projects (which typically are unrelated to the content or services provided by the web site or page) to a plurality of user nodes or devices linked to a communication network. In one embodiment, a distributed computing application is hosted by a web page or set of web pages served by a web site manager on the web server. For example, a set of instructions may be included in the web page instructing the user node to download and run a distributed computing application when the web page is first viewed. In contrast to prior distributed computing environments, the application is "bound" to the host web page in that it only runs when the web page is active or viewed rather than only running when the CPU of the node is idle (i.e., the web page or application is not active and/or the computer is not interacting with an operator).

A detector or mechanism is provided for determining whether the web page is being viewed and whether the CPU is available for processing a work unit (i.e., when being used below a predetermined portion of its capacity, the CPU can provide excess capacity CPU cycles to running the distributed computing application to process a work unit or portions of a work unit). If the page is being viewed and the CPU is available, the application is run by the CPU to process the work unit and the results are stored and/or transmitted back to the distributed computing project server.

Figure 1:
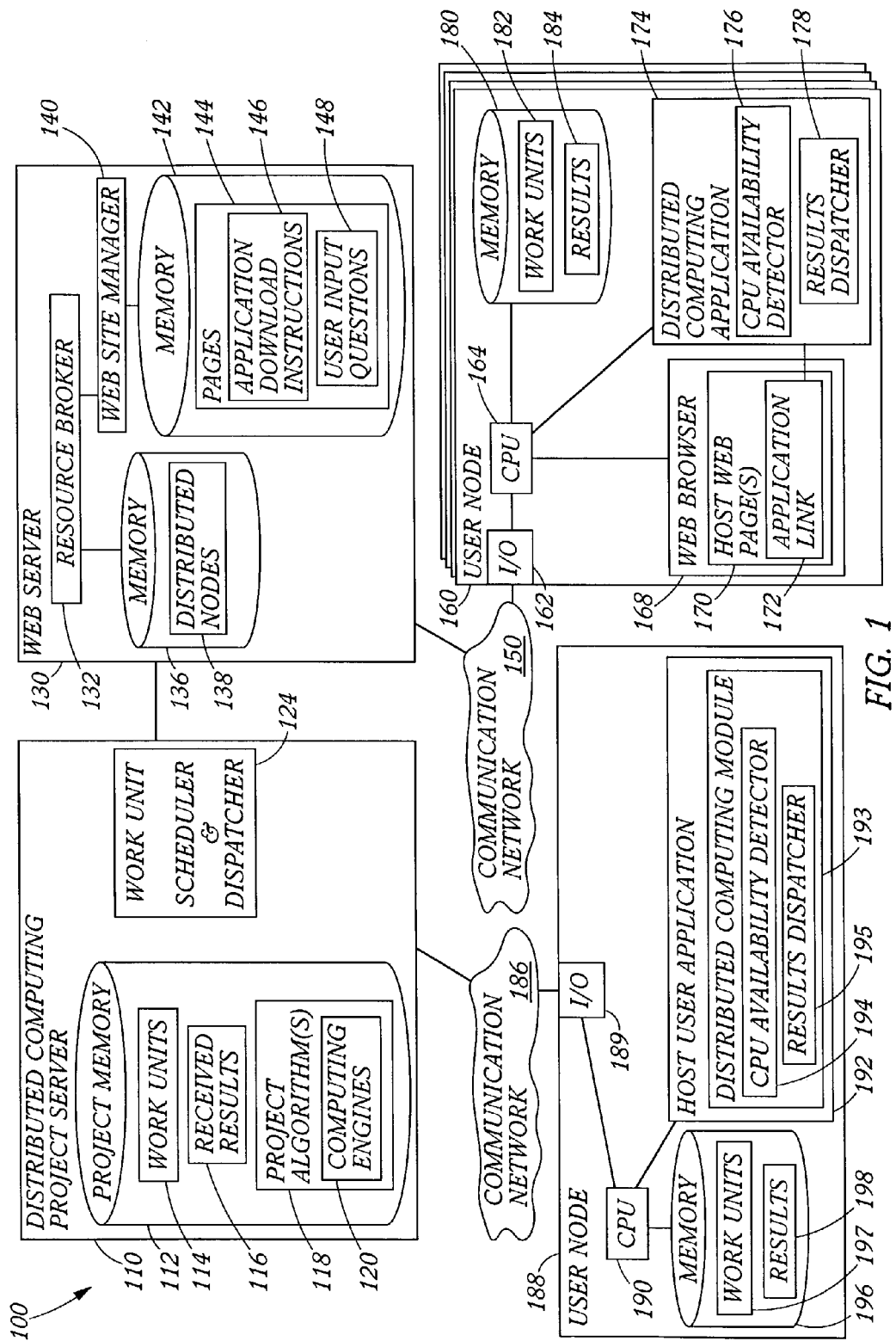
FIG. 1 illustrates in block diagram form a distributed computing system according to the present invention.
Figure 2:
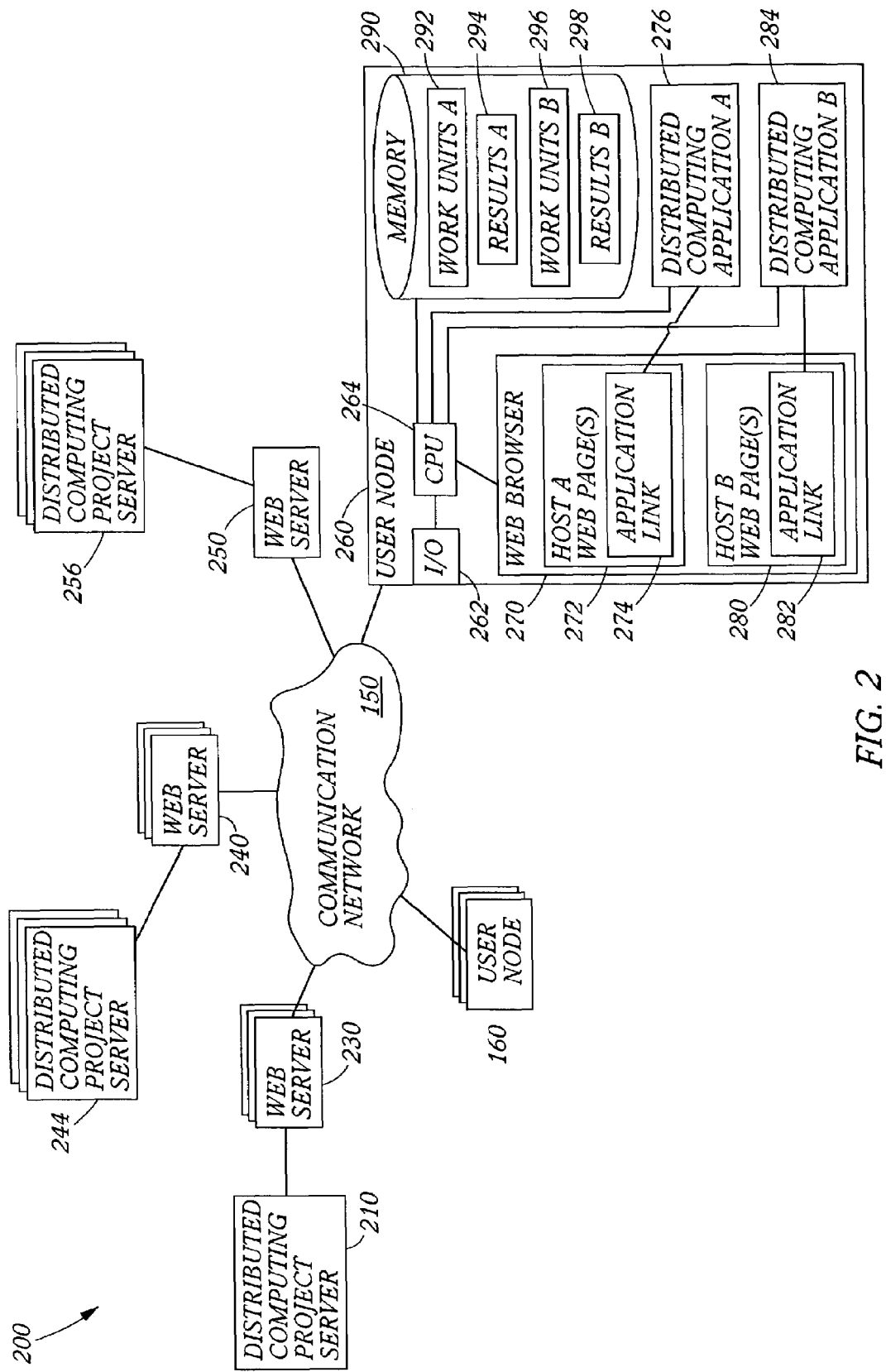
FIG. 2 illustrates another embodiment of a distributed computing system of the invention showing the use of the system to support multiple web servers, multiple distributed computing projects, and user nodes that support multiple distributed computing applications.
Figure 4:
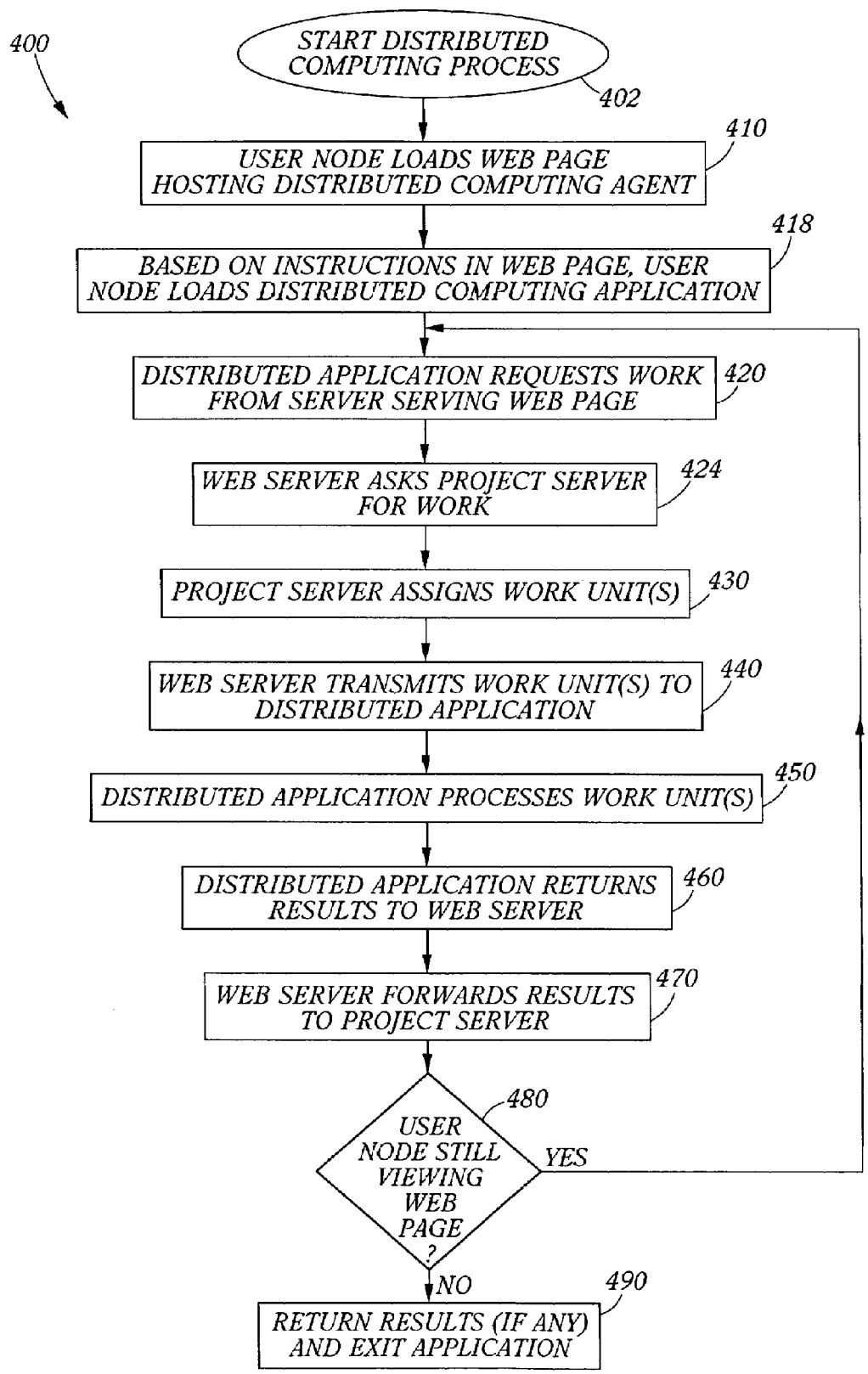
FIG. 4 is a flow diagram illustrating exemplary steps of a distributed computing process carried out according to the invention such as by the system of FIG. 1.
Figure 5:
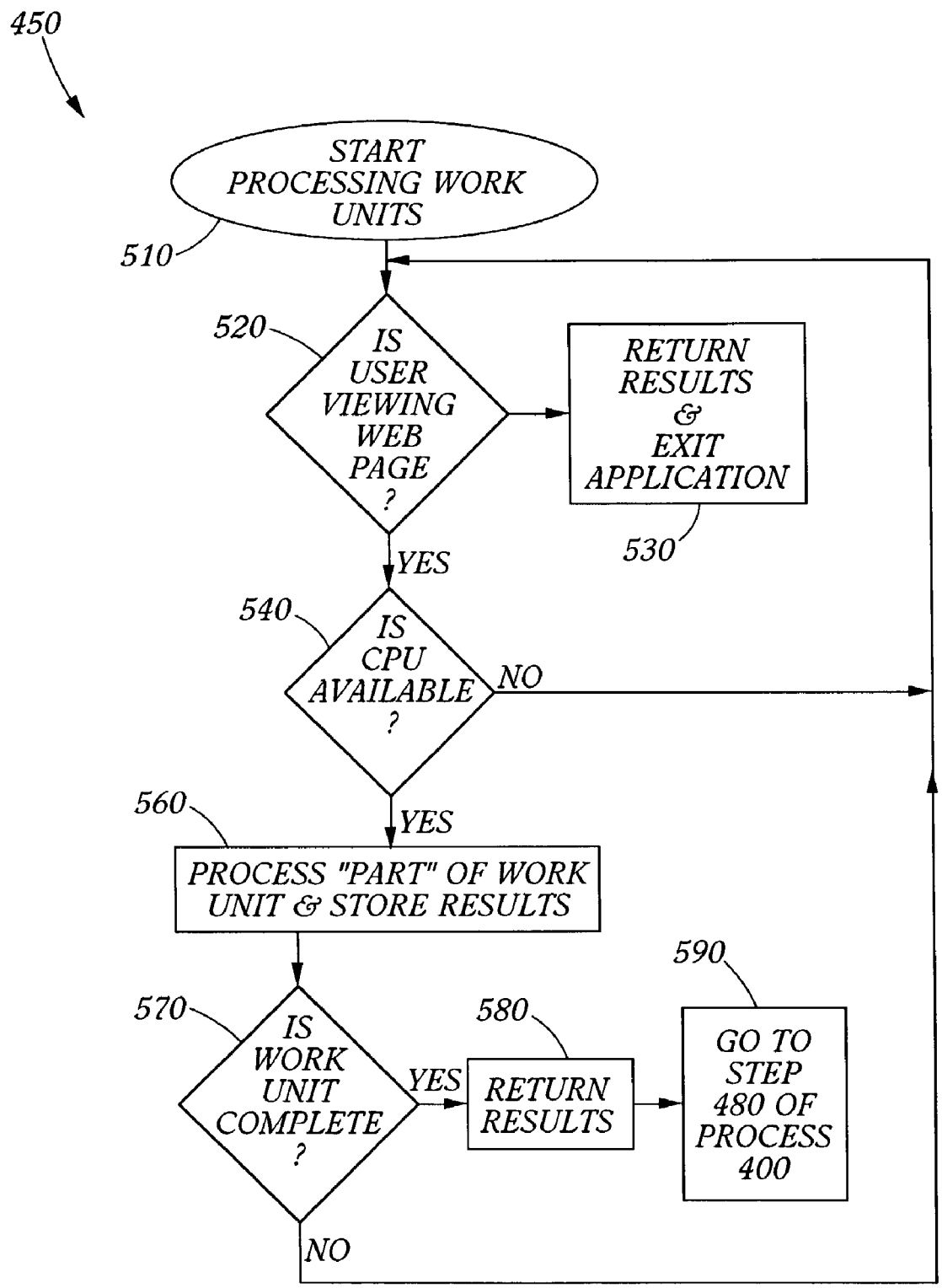
FIG. 5 is a flow diagram illustrating exemplary steps performed during by the distributed application in processing work units received from a distributed computing project server including verifying that a host web page or application is still being viewed or run and determining the availability of the CPU to process portions of the work units.

With this overview in mind, the following description begins with a discussion of a distributed computing system with reference to FIG. 1 describing the upper level elements used to provide the distributed computing functions of the invention. The description then proceeds to a discussion of a more complex distributed computed system with reference to FIG. 2 which is useful for illustrating the many combinations of web servers and project servers that may be used to implement the invention and also for illustrating how a single user node may support more than one distributed computing engine or application bound to a like number of web pages. An exemplary screen shot is provided in FIG. 3 that is useful for illustrating one useful window that may be displayed by a web browser on a user monitor during the viewing of a web page and concurrent running of distributed computing application. FIG. 4 illustrates a distributed computing process that may be carried out by the systems of FIGS. 1 and 2, and FIG. 5 illustrates in more detail the processing of a work unit by a distributed computing application of the invention.

In the following discussion, computer and network devices, such as distributed computing project server 110, web server 130, and user nodes 160, 188, are described in relation to their function rather than as being limited to particular electronic devices and computer architectures. To practice the invention, the computer and network devices may be any devices useful for providing the described functions, including well-known data processing and communication devices and systems such as personal, laptop, and notebook computers and mobile computing devices with processing, memory, and input/output components, and server devices configured to maintain and then transmit digital data over a communications network. Typically, the user nodes 160, 188 will be personal computers, work stations, or other computer devices or systems used by individuals for performing network activities, such as browsing the Internet, and/or performing typical personal computing functions, such as word processing, accessing personal information management (PIM) data, manipulating databases or spreadsheets, or other user applications. As such, the nodes 160, 188 will typically include a CPU, memory, input and output devices, a monitor, a web browser application, and user applications, but the invention is not limited to a particular configuration of the nodes 160, 188 and nearly any electronic device that performs computations may be utilized for distributed computing. Data, including client requests, service provider or carrier and content provider requests and responses, and transmissions to and from the web server 130 and among other components of the system 100, typically is communicated in digital format following standard communication and transfer protocols, such as TCP/IP, HTTP, HTTPS, FTP, and the like with web pages typically being transmitted as HTML documents, but this is not intended as a limitation of the invention.

FIG. 1 illustrates a distributed computing system 100 that is somewhat simplified for ease of description, but with an understanding of the system 100, those skilled in the arts will readily understand how the system 100 may be expanded to handle much more complex distributed computing applications. As shown, the system 100 includes a distributed computing project server or system 110 that is configured for processing a large computational analysis, such as those faced in the biotechnology, astronomy, and other scientific fields. To this end, the project server 110 includes memory 112 that may include a database management system or other memory management device for managing the storage and retrieval of work units 114 (i.e., incremental portions of a larger computational problem that can be assigned to and transferred to distributed user nodes 160, 188).

The memory 112 also includes results 116 received from user nodes 160, 188 and project algorithms 118 including the overall or larger scale algorithms used to analyze the particular problem being solved by the project server as well as computing engines 120 that can be downloaded to user nodes 160, 188 for processing of the work units 114. The computing engines 120 may be the distributed computing applications 174, 193 or may be only the computing engine or portion of such applications 174, 193 with the other components of the applications 174, 193 being made available by the web server 130 or in other memory accessible by the user nodes 160, 188. A work unit scheduler and dispatcher 124 is provided for ordering the work units 114 for completion, for communicating with web server 130 and user node 188, and for responding for requests for additional work from deployed and running distributed computing applications 174, 193 by transmitting one or more work units 114.

In the system 100, a web server 130 is linked to the project server 110 and positioned between the project server 110 and a communication network 150 (such as a LAN, a WAN, or other network and more typically, the Internet). The web server 130 functions to serve host web pages to user nodes 160 via the network 150 that include embedded instructions to load and run an application (such as computing engines 120) and to receive and process communications from the running applications 174 (such as requests for additional work and the transmittal of processing results). In this regard, the web server 130 is shown to include a resource broker 132 for managing memory 136 which is used to store a listing of participating distributed nodes 138. Such a listing is more important in systems 100 in which user nodes 160 may opt out of the distributed system 100 by deciding not to allow a distributed computing application 174 to run on their node 160. The memory 136 may also be used to store user node options (such as the amount of capacity available at a CPU 164 used to determine the CPU's availability or other user node information) but in most embodiments, such user node or application running parameters are stored in local memory 180 for use by the CPU 164 in properly running the distributed computing application 174 on the user node 160.

The resource broker 132 further works cooperatively with the web site manager 140 which may take any of the presently utilized forms of web site managers used for serving web pages to user nodes 160 over a network 150. The web site manager 140 functions to maintain in memory 142 one or more web pages 144 (such as HTML documents and the like) for serving to requesting user nodes 160, e.g., serving web pages to user nodes 160 that provide a web site domain or IP address via their web browser 168. According to the invention, some or all of the web pages 144 act as host web pages for the project server 110 in that the pages 144 include application download instructions 146 that are embedded in the page 144 (such as a portion of an HTML document). Significantly, the project being analyzed by the project server 110 may be wholly independent and unrelated to the content of the pages 144 (e.g., the web pages may be part of an online news service while the analysis project may be a DNA mapping project for a biotechnology company). As will become clear, some embodiments of the system 100 allow an operator of the user node 160 to provide input on whether the distributed computing application is allowed to run and if so, what operating parameters are to be followed (such as limiting when to run the application). To collect this user input, the pages 144 may include one or more user input questions 148 for prompting the operator of the user node 160 to input such operating parameters (which are typically stored in local memory 180 for use by the CPU 164 in running the application 174).

The system 100 further includes user nodes 160 which are linked to the network 150 and, importantly, which perform the distributed computing functions of the invention. As discussed above, such distributed computing is performed by the user node 160 in a manner that is relatively non-intrusive to the functioning of the user node 160 yet is effective in using a significant portion of the processing capacity that otherwise would be unused and, therefore, wasted. To this end, the user node 160 includes an input/output device 162 for communicating with the web server 130 and a CPU 164 (e.g., any standard microprocessor chip that performs the computational and decision-making functions of the computer or node) that controls operation of the user node 160. The CPU 164 may have a wide range of processing capacities to practice the invention but, in more recently produced computer devices, the CPUs have processing capacity that is measured in the cycles per second or provides as a processing speed that typically is in the thousands of megahertz. The processing capacity of user nodes 160 (i.e., personal computers, laptops, notebooks, work stations, and the like) is expected to continue to grow. Generally, only a small percentage of the capacity of the CPU 164 is used to run user applications, including web browsers such as browser 168, with the rest of the capacity being unused, with some estimates in the industry stating that 95 percent or more of the capacity of a typical CPU is not used during operation of a computer even when the operator is interacting actively with the CPU 164.

The user node 160 further includes a web browser 168 that may be selected from nearly any of the numerous web browser applications presently available or available in the future that are adapted for communicating requests to web server 130 via the network 150 to obtain web pages and other information (such as from web site manager 140). As shown, the web browser 168 is used (typically along with a monitor that is not shown) to view one or more host web pages 170. During operation of the system 100, the host web pages 170 are transmitted by the web site manager 140, such as in the form of an HTML document or other form useful for transferring digital information over the network 150. The host web pages 170 include a link 172 to a distributed application associated with the distributed computing project server 110. For example, the link 172 may be instructions to the CPU 164 to download the distributed computing application 174 and where to located the distributed computing engine (such as the computing engines 120 or, in some cases, a copy of the distributed computing application 174 is maintained by the web site manager 140 or resource broker 132).

The particular location or method of retrieving such application is not as important as the fact that the distributed computing application 174 is bound to the host web page or page 170. This binding or linking is performed in some embodiments such that an operator of the user node 160 is not made aware that the distributed computing application 174 has been downloaded and made active. In other embodiments, a prompt may be provided in the displayed web page 170 to allow the operator of the user node 160 to block loading of the application 174 or to provide operating parameters for the CPU 164 to follow in running the application 174 (such as user input questions 148).

These parameters may include setting how the determination when to run the application, i.e., setting levels of processing capacity (such as 20, 30, 40, or 50 percent or another fraction of the capacity) for use in determining when the CPU 164 is "busy" and cannot process work units or "available" for processing work units or portions of work units. The parameters may also include settings for the application 174 operates to inform the user that the application 174 is running in the background (such as by displaying an icon, by displaying a box within the web page with text and/or images, and the like).

The distributed computing application 174 generally includes the logic and/or algorithms necessary for performing analysis or processing of work units supplied from the project server 110 (such as work units 114) to produce results (such as results 116) desired by the project server 110. Typically, the problem being solved by the project server 110 is broken down into numerous smaller problems such that the processing performed and logic/algorithms required by the distributed computing application 174 are relatively small and thus, such distributed processing can be performed without overwhelming the CPU 164 capacity.

According to an important aspect of the invention, the distributed computing application 174 is adapted to only run when the web browser 168 is viewing the host web page(s) 170 and when the CPU 164 is not busy (or is available). A CPU availability detector or mechanism 176 is included in the distributed computing application 174 to determine when these two requirements are met (and to perform other actions as explained relative to FIGS. 4 and 5 such as requesting work units to process) in the user node 160. Briefly, when the detector 176 determines that the host web page(s) 170 is being viewed (note, that the application 174 may be tied to viewing a single page 170 or a set of pages 170 provided by web site manager 140 for a particular web site) and the CPU 164 is available, the CPU 164 runs the application 174 to process the next work unit or next work unit portion. Memory 180 is included for storing work units 182 received from the project server 110 via web server 130 and network 150. The results 184 of the processing performed by the distributed computing application 174 are also stored in the memory 180 (at least temporarily) and then transmitted by the results dispatcher 178 portion of the computing application 174 to the project server 110 via the web server 130 and network 150 for storage as received results 116.

The determination of whether the CPU 164 is available or is busy may be made by the CPU availability detector 176 in a number of ways. In one embodiment, the detector 174 simply checks to see if the CPU 164 is presently processing information from the web page 170. If not, a number of CPU cycles are then used to process a work unit 182 or a portion of a work unit 182. The number of cycles allowed to be sequentially used may be set to minimize the interference with operations of the web browser 168. In another embodiment, the detector 176 acts to determine the percentage of processing capacity for the CPU 164 that is presently being used, and when the active usage is less than a set capacity level (such as 50 percent), the CPU 164 runs the computing application in a timesharing fashion with the web browser 168 (and potentially numerous other functions being performed within the user node) to process a whole or a portion of a work unit 182. In either of these embodiments, it will be understood that the viewing of the web page 170 with the web browser 168 and the running of the application 174 by the CPU 164 are performed substantially concurrently (rather than only when the web page 170 is not being viewed and screen saver or idle mode of the user node 160 is experienced).

In addition to tying distributed computing applications to web pages, the system 100 also illustrates embedding distributed computing applications in user applications that are even more frequently used on user nodes. This arrangement may be particularly useful for large entities (such as universities, corporations, and the like) that have numerous personal computers linked to a network and that wish to configure the entity's computers into a distributed system with large computing capacity. As shown, the system 100 further includes another communications network 186 (such as a LAN, an Ethernet, a WAN, or other network that is more commonly used within a business) that is linked directly to the distributed computing project server 110 and to a user node(s) 188. In other embodiments, a server configured similar to the web server 130 may be inserted between the project server 110 and the user node(s) 188 to manage communications and distribution of work units and results (or to sell the use of the computing capacity created by the networked user nodes 188 to various project servers 110).

The user node 188 includes an I/O device 189 and a CPU 190 for controlling operations of the node 188 and providing a particular processing capacity. A host user application 192 is run on the user node 188 by the CPU 190. The host user application 192 may be nearly any typically run application including, but not limited to, a calendaring and organizing application, a word processing application, a database application, a spreadsheet application, and the other applications typically run for extended periods of time on the user node 188. Embedded within the application 192 is a distributed computing module or application 193 that is configured similar to the application 174 for processing work units 114 from the project server 110 in the background or in a relatively invisible manner to an operator of the user node 188.

Generally, during operation of the user node 188, the CPU 190 runs the distributed computing module 193 only when the host user application 192 is also being run and typically, will automatically start the module 193 upon initiating the host user application but some embodiments prompt an operator to provide permission to run the module 193 or to cancel its operation during the use of the host user application 192. The distributed computing module 193 includes a CPU availability detector 194 for determining (as discussed with reference to detector 176) when the CPU is available for processing whole or portions of work units 197. When the application 192 is running or active and the CPU 190 is available, the module 193 is run by the CPU 190 to retrieve and process work units 197 and to then use the results dispatcher 195 to transfer such results via the network 186 to the project server 110 for storage as received results 116. Memory 196 is used for storing work units 197 requested by the module 193 and received from the project server 110 and for storing results 198 of the processing of such work units 197 by the logic or algorithms provided in the distributed computing module 193.

The utilization of the CPU 164, 190 capacity may be performed in a number of ways to practice the invention, e.g., once the CPU 164, 190 is determined to be available and the page being viewed or user application being active. For example, the CPU 164, 190 may run the distributed computing module 174, 193 and the web browser 168 or host user application 192 by a time-sharing technique in which each of the applications gets a time "slice" of the CPU 164, 190 or by priority (e.g., each application can be assigned a priority level, and the CPU 164, 190 gives more time slices to an application with a higher priority level). The priority levels for the distributed computing applications or modules 174, 192 may take a number of forms such as, but not limited to: high priority, with such an application taking all available CPU time; normal priority, with such an application taking as much CPU time as other user applications; low priority, with such an application taking less time than other user applications; and idle priority, with such an application taking CPU time only if no other user applications are requesting CPU time and the CPU would otherwise be doing nothing. According to the invention, the sharing of the CPU 164, 190 with the distributed computing application or module 174, 192 is preferably performed to be relatively invisible to the user (i.e., little or no degradation in performance of the web browser 168 or host user application 192). In some cases, the CPU 164, 190 may run the distributed application 174, 192 between the user's keystrokes when they are typing a message or command or may run the application 174, 192 while a user is viewing a page 170 or using an application 192 but not interacting with the web browser 168 or host user application 192.

FIG. 2 illustrates another distributed computing system 200 of the invention in simplified form to describe a number of the ways in which the system 100 of FIG. 1 can be modified to handle more typical and more complex distributed computing environments. The system 200 includes a communications network 150 to which a number of user nodes 160, e.g., hundreds or thousands of Internet-enabled computers that are configured as shown in FIG. 1, are communicatively linked. Additionally, an example of an alternative user node 260 is linked to the communications network 150. In many cases, it may be desirable for each user node in a distributed computing environment to be configured to support more than one distributed computing project. As shown, this may be achieved by the user node 260 that includes an I/O device 262, a CPU 264, and memory 290 storing work units 292 and results 294 from a first distributed computing project and work units 296 and results 298 from a second distributed computing project, which is typically unrelated to the first project.

The user node 260 further includes a web browser 270 that is viewing a host web page(s) 272 associated with the first distributed computing project and having an application link 274 (such as loading instructions) to the distributed computing application 276. The distributed computing application 276 is adapted similarly to the application 174 of FIG. 1 (i.e., including a CPU availability detector and a results dispatcher not shown for ease of illustration) and is adapted to process work units 292 received from the first work project to obtain the results 294. The web browser 270 is also viewing, concurrently or sequentially with the first web page 272, a second host web page(s) 280 that includes an application link 282 to the second distributed computing application 284. The distributed computing application 284 is adapted similarly to the application 174 for processing work units 296 to produce results 298 (i.e., including a CPU availability detector and a results dispatcher not shown for ease of illustration). Each of the applications 276, 284 are further configured with a CPU availability detector for determining the availability of the CPU 264 and are adapted to only run when the host web pages 272, 280 are actively being viewed or processed by the browser 270. Two applications 276, 284 are shown for simplicity but it will be apparent that the user node 260 can run additional distributed computing applications with the specific number being tied to the number of web pages 272, 280 viewable by the web browser 270. Similarly, this multiple distributed computing application concept can be applied readily to the embedding of distributed computing applications within user applications as shown in FIG. 1. For example, user node 188 may be running two or more host user applications 192 simultaneously and each application 192 may be associated with a unique (or identical) distributed computing application 193 for processing work units 197.

The system 200 further illustrates that multiple web servers 230 (configured similarly to web server 130) may be utilized for maintaining differing web sites and serving differing web pages to user nodes 160, 260 for a single distributed computing project server 210 (configured similarly to project server 110). Alternatively, multiple web servers 240 may be utilized to support multiple distributed computing project servers 244 with each web server 240 working with differing ones of the project servers 244 or providing overlapping service to all or select sets of the project servers 244. Further, a single web server 250 may be utilized to serve multiple distributed computing project servers 256 with resource broker in such a web server 250 providing a more active role in determining the order to use in contacting project servers 256 for work units to transfer to user nodes 160, 260.

Figure 3:
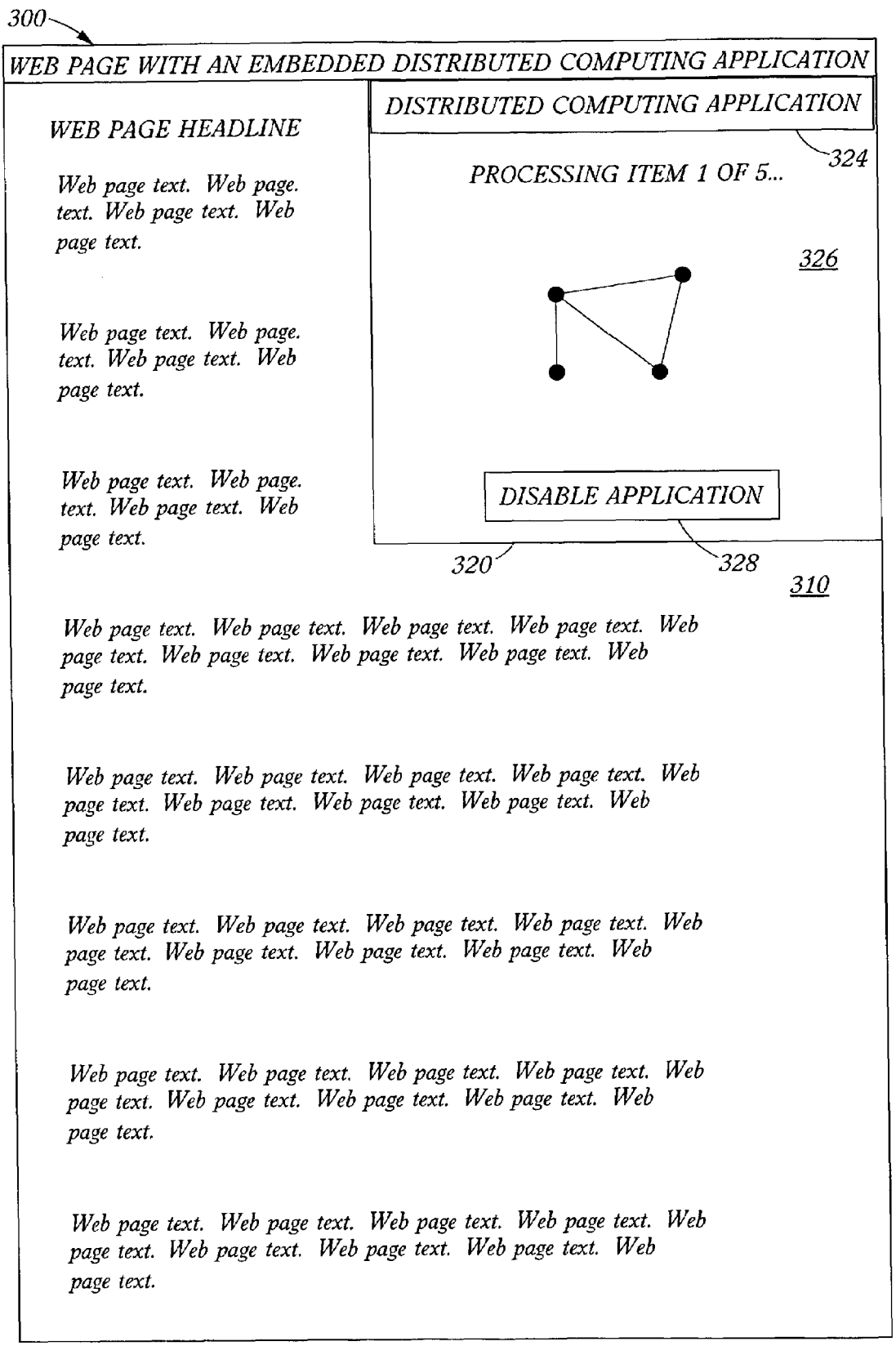
FIG. 3 is an exemplary screen shot displayed by a user node web browser during the running of a distributed computing application concurrently with viewing an associated host web page.

FIG. 3 illustrates one embodiment of a web browser window 300 that may be shown on a monitor (not shown) when the web browser 168 of FIG. 1 is displaying a host web page 170. As discussed previously, it is sometimes desirable for the distributed computing application 174 to be adapted for providing an indicator to an operator of the user node 160 when the application 174 is being run by the CPU 164 to process work units 182. This may be accomplished in numerous ways including audio and visual cues or indicators via a monitor of the user node 160. As shown, indication that the application 174 is being run by the CPU 164 is provided in the web page display window 300. The display or window 300 includes a web page portion 310 in which information, such as text, graphics, video, and the like, is displayed by the web browser 168. Within the window 300, an indication box 320 is displayed to provide a visual cue that the application 174 is running concurrently with the viewing of the page 310.

The indication box 320 may take a number of forms such as the form shown in FIG. 3 that includes a title bar 324 providing a name or title in text form of the distributed computing application 174 being run and a progress report section 326 that may provide text indicating progress of processing by the application 174 and/or graphical displays (such as moving graphics or still images) that visually show progress or simply show that the application 174 is active. Further, a button 328 (or other input mechanism) may be provided in the indication section 320 to allow the operator of the node 160 to cancel temporarily or permanently the operation of the application 174. Likewise, although not shown, the indication box 320 may include additional pull down menus or buttons for allowing an operator of the user node 160 to modify how the application 174 is run by the CPU 164, e.g., to raise or lower the processing capacity level used to determine availability of the CPU 164, to close the indication window 320, to reduce the size or change the location of the indication window or box 320, and to set other display or operational parameters. Further, the box 320 could be used for information gathering from the user and in such an embodiment, the box 320 could be used to display fields for the user to enter information (personal or otherwise) for use in marketing, demographics, statistical calculations, accounting (such as when the user is being paid for allowing the distributed application to run), and/or to authorize the user to run the distributed application (such as in embodiments in which the user is required to log in with a password for security reasons to run the distributed application).

FIG. 4 illustrates a distributed computing process 400 that may be carried out within the distributed computing system 100 (or in a differently configured system). The method 400 begins at 402 typically by establishing a web server, such as server 130, that is adapted to communicate with distributed computing projects, such as project server 110, to create web pages 144 with links to or loading instructions for distributed computing applications for the serviced project server(s) 110, and to respond to requests from user nodes 160 by serving host web pages 144 to the nodes 160. The method continues at 410 with a user node 160 requesting a web page 144 from a web server 130 and then loading or viewing the host web page 170 with a web browser 168.

At 418, the distributed computing application 174 hosted by or associated with the host web page 170 is loaded based on instructions in the web page 170 onto the user node 160. Note, the web server 130 may serve via the web site manager 140 a web site and pages 144 that have a content or provide a service that is related to the content of the analysis being performed by the project server 110 or, more typically, the web pages 144 will be unrelated to the efforts of the project server 110 (i.e., the web pages 144 may have sports news content while the analysis of the project server 110 may be directed to a complex graphical rendering or mapping human genetic information). At 418, the web page 170 may further include an election button (not shown) that allows the operator of the user node 160 to elect to allow the application 174 to run when viewing the web page 170 or elect to block such a background use of the CPU 164. In some embodiments, user input questions 148 are displayed to collect operating parameters that may be used in running the application 174 such as level of CPU usage to use in determining availability of the CPU 164. In some cases, the operator of the user node 160 may be paid for the use of the CPU 164 directly or by the reduction or waiving of fees associated with accessing the web pages 144 and its content. Alternatively, the user node 160 may be required to agree (and select via a button an agreement to such use) to the use of the CPU 164 to run the application 174 as a condition of accessing the web pages 144 (each time a page is viewed or upon initial registration for such as web site).

At 420, the distributed application 174 requests work from the server 130 that served the web page 170. At 424, the method continues with the web server 130 responding by asking the appropriate project server 110 (i.e., the project server 110 for which the distributed computing application 174 is developed and distributed) for one or more work units to distribute to the requesting user node 160. At 430, the project server 110 via the work unit scheduler and dispatcher 124 selects one or more work units 114, assigns these work units 114 out to the particular user node 160 (such as with a notation in a database field), and transfers the work unit(s) 114 to the web server 130. At 440, the web server 130 via the resource broker 132 transfers the work units 114 to the requesting user node 160, which stores the received work as work units 182 in the memory 180.

At 450 (which is explained in further detail with reference to FIG. 5), the distributed application 174 processes a whole or portions of a work unit 182 and stores the results 184 in memory 180. At 460, the distributed application 174 via the results dispatcher 178 returns results 184 to the web server 130, which at 470 forwards received results to the distributed computing project server 110 for storage as received results 116 in memory 112. At 480, the distributed application 174 determines whether the user node 160 via the web browser 168 is still viewing the web page 170 and if so, then the method 400 continues at 420 with the distributed application requesting additional work (or with 450 with the distributed application 174 completing remaining portions or whole work units 182). If the page 170 is not being viewed by the user node 160, the method continues with 490 with the distributed application 174 using the results dispatcher 178 to return any results 184 (partial or complete) stored in memory 180 to the web server 130 for forwarding to the project server 110.

At this point in the process 400, the distributed application 174 is exited or terminated by the CPU 164. In other words, the application 174 is bound to the web page 170 and only operates when the web page 170 is being viewed (or for only short times thereafter to complete a processing function and for returning any created results 184). In some embodiments, the application 174 is instead bound to a website or a set of web pages such that when the user stays within a particular website or within a set of web pages the distributed application 174 can be run. In these embodiments, at 480, the distributed application 174 determined whether the web site is still being accessed or one of the web pages in one or more particular sets of web pages is being viewed.

FIG. 5 illustrates in more detail step 450 of distributed computing process 400. As shown, at 510, the distributed application 174 begins processing 450 a next work unit 182. The processing 450 begins at 520 with the distributed application 174 verifying that the user node 160 is still operating the web browser 168 to view the host web page 170 linked to the application 174. If viewing has terminated, then the processing 450 concludes at 530 with the return of any results 184 via dispatcher 178 and exiting the application 174. If viewing is active, the distributed computing application 174 acts at 540 to determine with the CPU availability detector 176 whether the CPU 164 is available for processing work units 182 or is busy. As discussed earlier, the detector 176 may determine availability based on a number of criteria and in a number of ways. In one embodiment, the detector 176 determines the present usage of the CPU 164 relative to its capacity and if usage is below a particular level (such as a default percentage, e.g., less than 10 percent, 20 percent, 30 percent, or other useful fractional usage, or a user-specified usage level, e.g., less than 50 percent, 75 percent, or other useful fractional usage), then the CPU 164 is determined to be "available." In other cases, the detector 176 may simply check to see if the CPU 164 is actively processing work related to the web page 170 and if not, identify the CPU 164 as "available."

If at 540 the CPU 164 is determined to not be available, the processing 450 continues with step 520 to determine whether the page 170 is still being viewed. In other words, the process 450 continues to check to see that both operating criteria, i.e., the page is active or being viewed and the CPU is not busy, are satisfied prior to using the CPU 164 for processing work units 182. If the CPU 164 is available, then processing 450 continues at 560 with the CPU 164 running the logic of the distributed computing application 174 to process a work unit 182 or a portion of a work unit 182. This processing typically includes retrieving the next work unit 182 or next portion when there are more than one work unit 182 in memory 180 or simply retrieving the work unit 182 if only one work unit 182 is received at a time from the project server 110. At 570, the distributed computing application 174 determines whether the work unit 182 has been completely processed and if not, then the process 450 continues at 520 with the determination of whether the page 170 is being viewed and whether the CPU 164 is still available. If the work unit 182 is fully processed, then the processing 450 continues at 580 with returning with dispatcher 178 the results 184 of the processing to the web server 130 and then to the project server 110. At 590, the processing 450 returns control to the distributed computing process 400 such as at step 460 or to 480 as appropriate.

FIGS. 2-5 are directed to distributed computing with the distributed application linked to operation of a web browser, but FIGS. 2-5 also describe, with only slight modification, use of a host user application, such as user application 192 of FIG. 1, to run one or more distributed computing modules or applications. Referring, for example, to FIG. 2, the web browser 270 may be replaced with a user application configured similarly to host user application 192 of FIG. 1 but including two distributed computing modules 193. In this manner, the host user module can be used to run more than one distributed computing module for one or more distributed computing project servers as shown in FIG. 2. Likewise, the teaching of FIG. 3 can be applied to a display provided by a host user application, such as application 193, to allow the user to know that a distributed computing module is running, its progress, to cancel its operation, and/or to input user information or input operating parameters.

The methods and processes of FIGS. 4 and 5 also generally apply to a host user application-based distributed computing environment (such as that shown in FIG. 1 with reference to user node 188). The key modification is that instead of testing for viewing of a web page (or set of web pages or a website) the distributed computing module (such as module 193) tests whether a host user application (such as application 192) is running and only runs the distributed module when the host user application is active and the CPU is available (i.e., not "busy").

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method of performing distributed computing, comprising:
 receiving a request for a web page from a user node wherein the user node includes a processor with a processing capacity and a browser for viewing web pages provided over a network;
 in response to the request, serving a host web page to the user node, the host web page comprising an instruction set for loading a distributed computing application on the user node;
 receiving a request for work unrelated to the host web page from the distributed computing application;
 transferring a work unit for a distributed project associated with the distributed computing application to the user node wherein the distributed computing application is configured to determine whether the browser is still viewing the host web page and whether the processor possesses excess capacity for processing the work unit and to only initiate performance of the processing of the work unit to obtain the result when the browser is still viewing the host web page and the processor possesses excess capacity for processing the work unit; and
 receiving a result of processing the work unit with the distributed computing application.

2. The method of claim 1, wherein the availability of the processor is determined by the distributed computing application based on comparison of capacity of the processor being used to a preset level of the processor capacity.

3. A distributed computing system, comprising:
 a communications network adapted for transmitting digital data;
 a plurality of user nodes linked to the communications network, each of the user nodes including a browser for reguesting, receiving and viewing a host web page provided over the communications network, a central processing unit with a processing capacity, a memory device storing units of work for a distributed computing project, and a host user application run by the central processing unit;
 wherein the host user application includes a distributed computing module comprising logic processing the work unit to produce a result and a processor availability detector determining whether the host user application is active, whether the browser is still viewing the host web page and whether the central processing unit possesses excess capacity, the distributed computing module only processing the work unit when the host user application is determined active, the host web page is determined to be viewed and the central processing unit is determined to possess excess capacity for processing the work unit; and
 a project server linked to the network with a memory device for storing the units of work and the results created by the distributed computing module, wherein the distributed computing module requests the units of work from the project server and transmits the results to the project server, and wherein the host user application and the distributed computing project are independent.

4. The system of claim 3, wherein the central processing unit is determined available by the processor availability detector determines the central processing unit is operating at a rate that is below a predefined level of the processing capacity.

5. The system of claim 3, wherein each of the user nodes further includes an additional host user application run by the central processing unit, the additional host user application including an additional distributed computing module comprising logic processing an additional work unit from an additional distributed computing project.

6. A method of using a user node as a distributed computing device, comprising:
 linking the user node to a digital data communications network, the user node including a processor with a processing capacity, a memory device, and a browser for viewing documents provided over the network;
 operating the browser to request a document over the network from a server;
 in response, receiving a host document;
 operating the browser to view the host document, wherein the operating includes performing instructions in the host document causing a distributed computing application to be loaded onto the user node;
 with the distributed computing application, requesting work from the server;
 receiving a work unit from the server for a distributed computing project, and wherein the host document has a content unrelated to the distributed computing project; and
 running the distributed computing application to process the work unit to generate a result, wherein prior to the running, determining whether the browser is still viewing the host document and whether present operations of the processor exceeds a preset level of the processing capacity and only performing the running when the browser is still viewing the host document and the preset level is not exceeded by the present processor operations still viewing the host document and whether present operations of the processor exceeds a preset level of the processing capacity and only performing the running when the browser is still viewing the host document and the preset level is not exceeded by the present processor operations.

7. The method of claim 6, further including prior to the determining, receiving from an operator of the user node the present level.

8. The method of claim 6, further including prior to the running, determining that the operating of the browser to view the document is occurring and if not, returning the result to the server.

9. The method of claim 6, further including after the running, determining whether the work unit has been fully processed, and if not, repeating the running.

10. A method of using a user node as a distributed computing device, comprising:

receiving and viewing, by a browser on the user node, a host document requested from a server;

performing instructions in the host document for loading a host user application on the user node operable by a processor of the user node;

running the host user application with the user node processor including running a distributed computing module operatively linked to the host user application;

operating the distributed computing module to request work from a the server communicatively linked to the user node;

in response to the work request, receiving a work unit from the server for a distributed computing project; and running the distributed computing module concurrently with the host user application to process the work unit, wherein the host user application is unrelated to the distributed computing project, and wherein the distributed computing module comprises a processor availability detector and further including prior to the distributed computing module running, operating the processor availability detector to determine if the processor possesses excess capacity for processing the work unit and the browser is still viewing the host document and only performing the running when the processor possesses excess capacity for processing the work unit and the browser is still viewing the host document.

11. The method of claim 10, wherein the availability of the processor for processing the work unit is determined by comparing present applications of the processor with a preset fraction of a potential operating capacity of the processor.

12. The method of claim 10, further including prior to the distributed computing module running, determining with the distributed computing module that the host user application is being run by the processor.

13. The method of claim 10, wherein the processing of the work unit includes generating a result, the method further including transmitting the generated result to the server.

14. The method of claim 10, further including:

loading an additional host user application on the user node operable by the processor of the user node;

running the additional host user application with the user node processor including running an additional distributed computing module operatively linked to the additional host user application;

operating the additional distributed computing module to request work from the server;

in response to the work request, receiving an additional work unit from the server for another distributed computing project; and running the additional distributed computing module concurrently with the additional host user application to process the additional work unit.

* * * * *

UNITED STATES PATENT AND TRADEMARK OFFICE
CERTIFICATE OF CORRECTION

PATENT NO.         : 7,293,059 B2                                           Page 1 of 1
APPLICATION NO. : 10/407414
DATED                : November 6, 2007
INVENTOR(S)       : Kirk Pearson It is certified that error appears in the above-identified patent and that said Letters Patent is hereby corrected as shown below:

Column 14, lines 55-60, delete, ~~still viewing the host document and whether present operations of the processor exceeds a preset level of the processing capacity and only performing the running when the browser is still viewing the host document and the preset level is not exceeded by the present processor operations.~~

Column 15, line 15, delete, "a"

Signed and Sealed this

Twenty Second Day of April, 2008

JON W. DUDAS
*Director of the United States Patent and Trademark Office*